United States Patent
Volk

(10) Patent No.: US 9,837,901 B1
(45) Date of Patent: Dec. 5, 2017

(54) SINGLE-INPUT MULTIPLE-OUTPUT INVERTING AND NON-INVERTING BUCK/BOOST SWITCHING REGULATOR CONTROL METHOD AND APPARATUS

(71) Applicant: Maxim Integrated Products, Inc., San Jose, CA (US)

(72) Inventor: Karl Volk, Scotts Valley, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 233 days.

(21) Appl. No.: 14/745,788

(22) Filed: Jun. 22, 2015

(51) Int. Cl.
*H02M 3/158* (2006.01)
*H02M 1/00* (2006.01)

(52) U.S. Cl.
CPC .......... *H02M 3/158* (2013.01); *H02M 3/1582* (2013.01); *H02M 2001/0003* (2013.01)

(58) Field of Classification Search
CPC ............... H02M 3/158; H02M 3/1582; H02M 2001/0003
USPC ............................................. 307/31; 363/63
See application file for complete search history.

(56) References Cited

U.S. PATENT DOCUMENTS

| | | | | |
|---|---|---|---|---|
| 9,189,002 | B1* | 11/2015 | Luciano | H02M 3/1582 |
| 2003/0117209 | A1* | 6/2003 | Tsuchiya | H02M 3/1582 |
| | | | | 327/530 |
| 2007/0075689 | A1* | 4/2007 | Kinder | H02M 3/1582 |
| | | | | 323/259 |
| 2010/0052638 | A1* | 3/2010 | Lesso | H02M 3/1582 |
| | | | | 323/282 |
| 2011/0089920 | A1* | 4/2011 | Leong | H02M 3/1582 |
| | | | | 323/283 |
| 2014/0225577 | A1* | 8/2014 | Ivanov | H02M 3/1582 |
| | | | | 323/225 |
| 2014/0239720 | A1* | 8/2014 | Liu | H02M 3/1582 |
| | | | | 307/31 |

OTHER PUBLICATIONS

"Single-Inductor, Multiple-Output (SIMO) Regulator for AMOLED," TPS65136, Texas Instruments Inc., Jul. 2008.*
Giral, Roberto et al. "Symmetrical Power Supply for 42 V Automotive Applications." Facta Universitatis (Nis); Ser.: Elec. Energ. vol. 17, Dec. 2004; pp. 365-376.

(Continued)

*Primary Examiner* — Jue Zhang
*Assistant Examiner* — Jye-June Lee

(57) ABSTRACT

A system includes an inductor having first and second terminals. First and second transistors have first terminals connected to the first and second terminals of the inductor, respectively, and second terminals connected to a power supply and a common potential, respectively. Third and fourth transistors have first terminals connected to the first and second terminals of the inductor, respectively, and second terminals providing first and second output voltages of first and second polarities, respectively. First and second feedback circuits generate first and second feedback signals based on the first and second output voltages, respectively. A first control circuit controls the first and third transistors based on the second feedback signal and not based on the first feedback signal. A second control circuit controls the second and fourth transistors based on the first feedback signal and not based on the second feedback signal.

21 Claims, 8 Drawing Sheets

(56) References Cited

OTHER PUBLICATIONS

Maxim Integrated Products. "Dual-Output (Positive and Negative), DC-DC Converter for CCD and LCD". 19/1353; Rev 1 (Jun. 2003), pp. 1-11. Retrieved from http://www.maximintegrated.com/en/products/power/switching-regulators/MAX685.html#popuppdf.

* cited by examiner

SINGLE-INPUT MULTIPLE-OUTPUT INVERTING AND NON-INVERTING BUCK/BOOST SWITCHING REGULATOR CONTROL METHOD AND APPARATUS

FIELD

The present disclosure relates generally to voltage regulators and more particularly to controlling single-input multiple-output (SIMO) inverting and non-inverting Buck/Boost switching regulators.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A single-input, multiple-output (SIMO) switching regulator architecture allows multiple switching regulators to be combined and uses just one inductor. By using a single inductor, the physical size of the switching regulator may be reduced. Additionally, some of the power switches can be shared between the switching regulators. The challenge with the SIMO architecture is how to build a simple control scheme that fully utilizes the energy storage capability of the inductor and the current ratings for the power switches so that these components do not become large enough to offset the advantages of the SIMO architecture.

SUMMARY

A system comprises an inductor; first, second, third, and fourth transistors; first and second feedback circuits, and first and second control circuits. The inductor has first and second terminals. The first and second transistors have first terminals connected to the first and second terminals of the inductor, respectively. A second terminal of the first transistor is connected to a power supply, and a second terminal of the second transistor is connected to a common potential. The third and fourth transistors have first terminals connected to the first and second terminals of the inductor, respectively. A second terminal of the third transistor provides a first output voltage of a first polarity, and a second terminal of the fourth transistor provides a second output voltage of a second polarity. The first and second feedback circuits generate first and second feedback signals based on the first and second output voltages, respectively. The first control circuit controls the first and third transistors based on the second feedback signal and not based on the first feedback signal. The second control circuit controls the second and fourth transistors based on the first feedback signal and not based on the second feedback signal.

In another feature, both the first and second output voltages are of Buck-Boost type, the first output voltage being an inverting buck-boost type, and the second output voltage being a non-inverting buck-boost type.

In another feature, the first and second control circuits operate the first and second transistors in pulse-width modulated current-mode continuous conduction mode at a duty cycle, and the first and second control circuits turn on the third and fourth transistors and provide a current path through the inductor during a second half of the duty cycle.

In another feature, the first and second control circuits respectively operate the first and second transistors in peak-current mode and modulate beginning of turn-off time of the first and second transistors to regulate current through a load connected across the second terminals of the third and fourth transistors.

In other features, the first feedback circuit comprises a first voltage divider connected across the first output voltage and a reference voltage, and a first error amplifier that has first and second inputs respectively coupled to an output of the first voltage divider and a common potential. The second feedback circuit comprises a second voltage divider connected across the second output voltage and the common potential, and a second error amplifier that has first and second inputs respectively coupled to an output of the second voltage divider and the reference voltage.

In other features, the first control circuit comprises a first current sensing amplifier that senses current through the first transistor and a first comparator that generates a first control signal to control the first and third transistors based on the second feedback signal and an output of the first current sensing amplifier. The second control circuit comprises a second current sensing amplifier that senses current through the second transistor and a second comparator that generates a second control signal to control the second and fourth transistors based on the first feedback signal and an output of the second current sensing amplifier.

In another feature, the system further comprises a slope compensator that outputs a compensating signal to the first and second control circuits that stabilizes operation of the first and second transistors at a duty cycle greater than or equal to 50% and that stabilizes the first and second output voltages in response to input voltage transients.

In still other features, a system comprises a regulator, first and second feedback circuits, and first and second control circuits. The regulator comprises first and second transistors generating first and second outputs of first and second polarities, respectively. The first and second feedback circuits generate first and second feedback signals based on the first and second outputs, respectively. The first control circuit controls the first transistor based on the second feedback signal and not based on the first feedback signal. The second control circuit controls the second transistor based on the first feedback signal and not based on the second feedback signal.

In another feature, both the first and second outputs are of Buck-Boost type, the first output being an inverting buck-boost type, and the second output being a non-inverting buck-boost type.

In other features, the first feedback circuit comprises a first voltage divider connected across the first output and a reference voltage, and a first error amplifier that has first and second inputs respectively coupled to the output of the first voltage divider and a common potential. The second feedback circuit comprises a second voltage divider connected across the second output and the common potential, and a second error amplifier that has first and second inputs respectively coupled to the output of the second voltage divider and the reference voltage.

In another feature, the system further comprises a slope compensator that outputs a compensating signal to the first and second control circuits that stabilizes operation of the first and second transistors at a duty cycle greater than or equal to 50% and that stabilizes the first and second outputs in response to input voltage transients.

In another feature, the regulator further comprises third and fourth transistors and an inductor. First terminals of the first and second transistors are respectively connected to first and second terminals of the inductor. First terminals of the third and fourth transistors are respectively connected to the first and second terminals of the inductor. Second terminals of the first and second transistors are respectively connected to a power supply and a common potential. Second terminals of the third and fourth transistors respectively provide the first and second outputs.

In another feature, the first and second control circuits respectively operate the first and second transistors in pulse-width modulated current-mode continuous conduction mode at a duty cycle, and the first and second control circuits respectively turn on the third and fourth transistors and provide a current path through the inductor during a second half of the duty cycle.

In another feature, the first and second control circuits respectively operate the first and second transistors in peak-current mode and respectively modulate beginning of turn-off time of the first and second transistors to regulate current through a load connected across the second terminals of the third and fourth transistors.

In other features, the first control circuit comprises a first current sensing amplifier that senses current through the first transistor and a first comparator that generates a first control signal to control the first and third transistors based on the second feedback signal and an output of the first current sensing amplifier. The second control circuit comprises a second current sensing amplifier that senses current through the second transistor and a second comparator that generates a second control signal to control the second and fourth transistors based on the first feedback signal and an output of the second current sensing amplifier.

In still other features, a method comprises generating first and second output voltages of first and second polarities using first and second transistors, respectively; generating first and second feedback signals based on the first and second output voltages, respectively; controlling the first transistor based on the second feedback signal and not based on the first feedback signal; and controlling the second transistor based on the first feedback signal and not based on the second feedback signal.

In another feature, the method further comprises generating the first and second output voltages using a single inductor coupled to the first and second transistors. Both the first and second output voltages are of Buck-Boost type, with one of the first and second output voltages being an inverting Buck-Boost type, and the other of the first and second output voltages being a non-inverting Buck-Boost type.

In another feature, the method further comprises generating the first and second output voltages using a single inductor coupled to the first and second transistors; operating the first and second transistors in pulse-width modulated current-mode continuous conduction mode at a duty cycle; and providing a current path through the single inductor during a second half of the duty cycle.

In another feature, the method further comprises operating the first and second transistors in peak-current mode; and modulating beginning of turn-off time of the first and second transistors to regulate current through a load, voltage across a load, current into two independent loads, voltage across two independent loads, and/or current into one load and voltage across another load.

In another feature, the method further comprises operating the first and second transistors in valley-current mode; and modulating beginning of turn-on time of the first and second transistors to regulate current through a load, voltage across a load, current into two independent loads, voltage across two independent loads, and/or current into one load and voltage across another load.

In another feature, the method further comprises operating the first and second transistors in average-current mode; and modulating beginning of turn-on time and/or turn-off time of the first and second transistors to regulate current through a load, voltage across a load, current into two independent loads, voltage across two independent loads, and/or current into one load and voltage across another load.

In another feature, the method further comprises operating the first and second transistors in current mode or voltage mode; and modulating beginning of turn-on time and/or turn-off time of the first and second transistors to regulate current through a load, voltage across a load, current into two independent loads, voltage across two independent loads, and/or current into one load and voltage across another load.

In another feature, the method further comprises generating the first and second output voltages using a single inductor coupled to the first and second transistors; sensing first and second currents respectively through the first and second transistors or a current-sense element in series with the first and second transistors or a current-sense network in parallel with the first and second transistors or a current-sense network in parallel with the single inductor; generating a first control signal to control the first transistor based on the second feedback signal and the first current; and generating a second control signal to control the second transistor based on the first feedback signal and the second current.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

Figure 1:
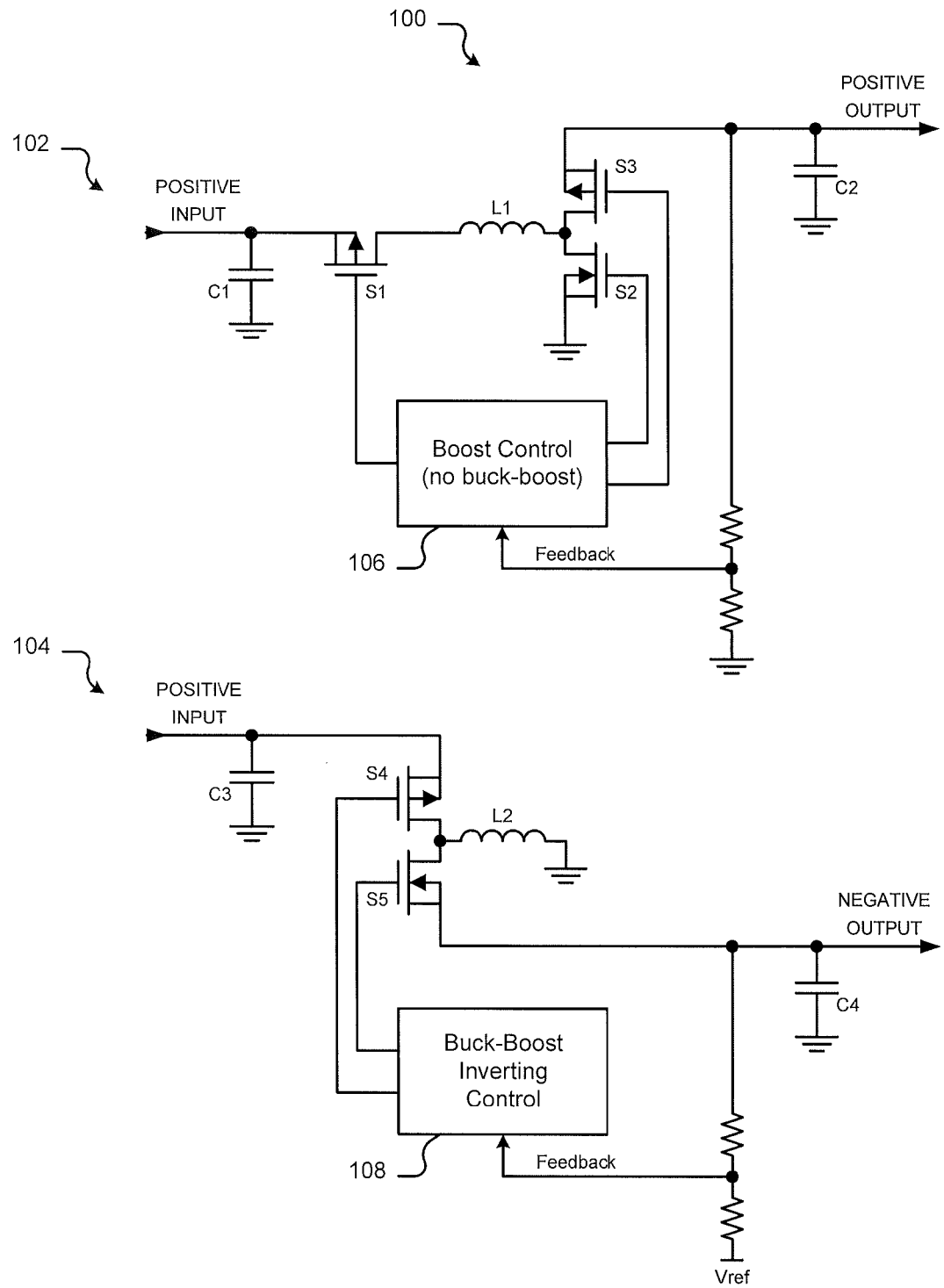
FIG. 1 is a schematic of a switching regulator that generates a non-inverting Boost output and an inverting Buck-Boost output using two independent switching regulators.

4A) using a novel feedback scheme to generate a non-inverting Buck-Boost output and an inverting Buck-Boost output.

In the drawings, reference numbers may be reused to identify similar and/or identical elements.

DETAILED DESCRIPTION

The present disclosure relates to a control circuit for a single-input multiple-output (SIMO) architecture with one positive (non-inverting) Buck-Boost output and a second negative (inverting) Buck-Boost output. There are many ways to generate non-inverting and inverting outputs. Some circuits use two independent switching regulators while others use a single switching regulator to generate non-inverting and inverting outputs.

FIG. 1 shows a switching regulator 100 that generates non-inverting and inverting outputs using two independent switching regulators 102 and 104. The switching regulator 102 generates a non-inverting output using a Boost control circuit 106 and includes three switches (S1, S2, and S3) and a first inductor (L1). The switch S1 is optional and used to enhance the startup and shutdown characteristics of regulator 102. The switching regulator 104 generates an inverting output using a Buck-Boost inverting control circuit 108 and includes two switches (S4 and S5) and a second inductor (L2). Thus, the switching regulator 100 generate a non-inverting output with Boost control and an inverting output with Buck-Boost control using a total of five switches (S1, S2, S3, S4, and S5) and two inductors (L1 and L2).

Figure 2:
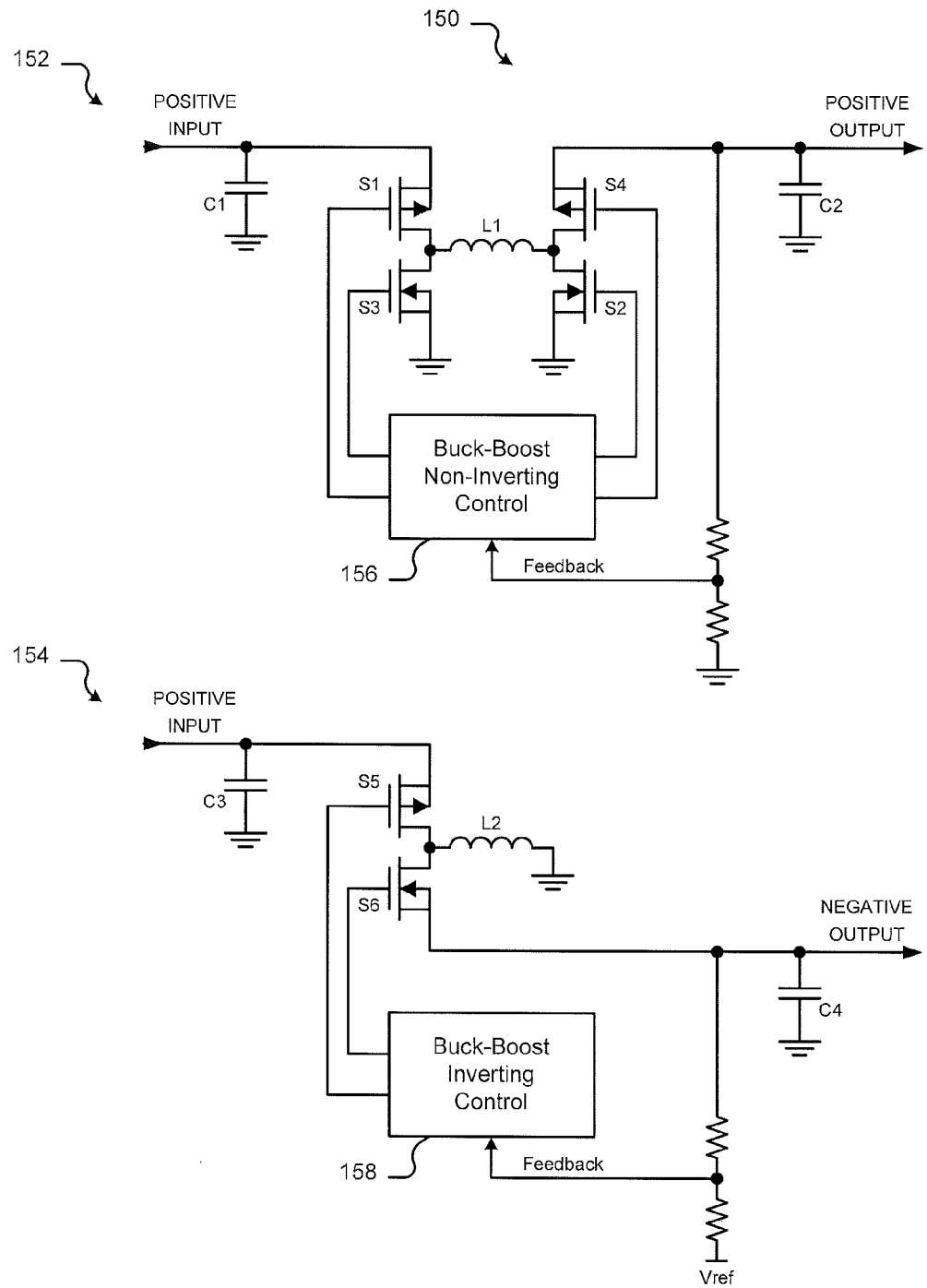
FIG. 2 is a schematic of a switching regulator that generates a non-inverting Buck-Boost output and an inverting Buck-Boost output using two independent switching regulators.

FIG. 2 shows a switching regulator 150 that generates non-inverting and inverting outputs using two independent switching regulators 152 and 154. The switching regulator 152 generates a non-inverting output using a Buck-Boost control circuit 156 and includes four switches (S1, S2, S3, and S4) and a first inductor (L1). The switching regulator 154 generates an inverting output using a Buck-Boost inverting control circuit 158 and includes two switches (S5 and S6) and a second inductor (L2). Thus, the switching regulator 150 generate a non-inverting output with Buck-Boost control and an inverting output with Buck-Boost control using a total of six switches (S1, S2, S3, S4, S5, and S6) and two inductors (L1 and L2).

FIGS. 1 and 2 show that there are two different ways of generating a non-inverting output but only one way of generating an inverting output using two independent switching regulators. The two different ways of generating a non-inverting output include using Boost control and three switches or Buck-Boost control and four switches while the inverting output can be generated using Buck-Boost control and two switches.

Figure 3A:
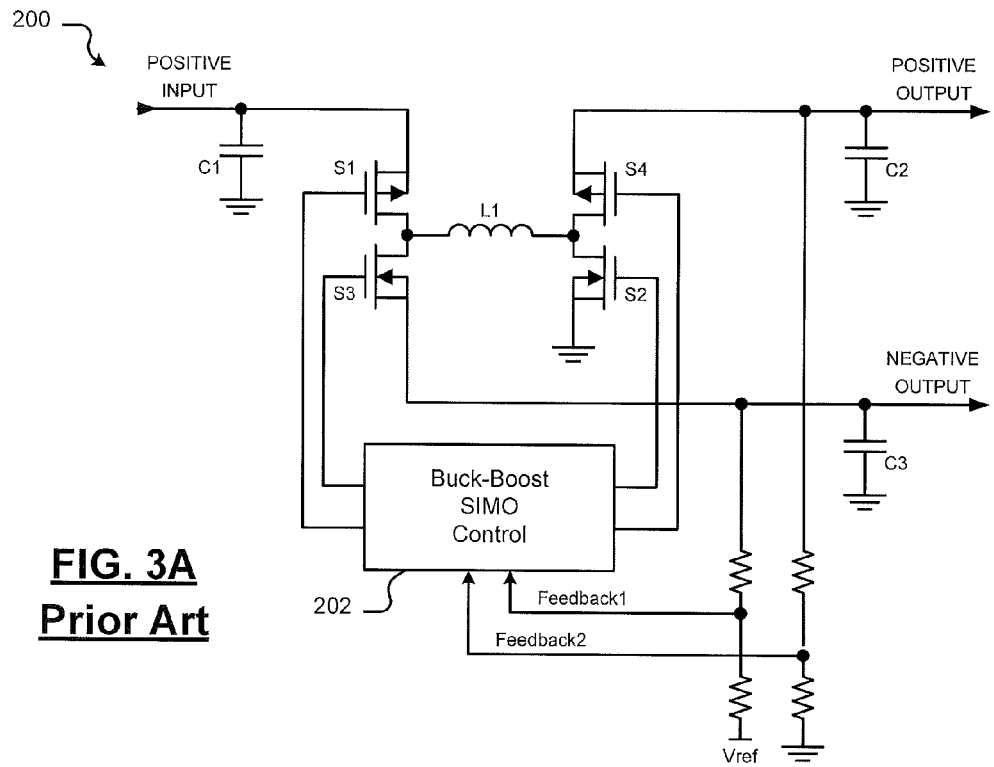
FIG. 3A is a schematic of a switching regulator that uses a single-input, multiple output (SIMO) architecture to generate non-inverting and inverting outputs.

FIG. 3A shows a switching regulator 200 that uses a SIMO architecture (i.e., a single switching regulator) to generate non-inverting and inverting outputs. The switching regulator 200 generates the non-inverting and inverting outputs using a Buck-Boost SIMO control circuit 202 and includes four switches (S1, S2, S3, and S4) and a single inductor (L1).

Figure 3B:
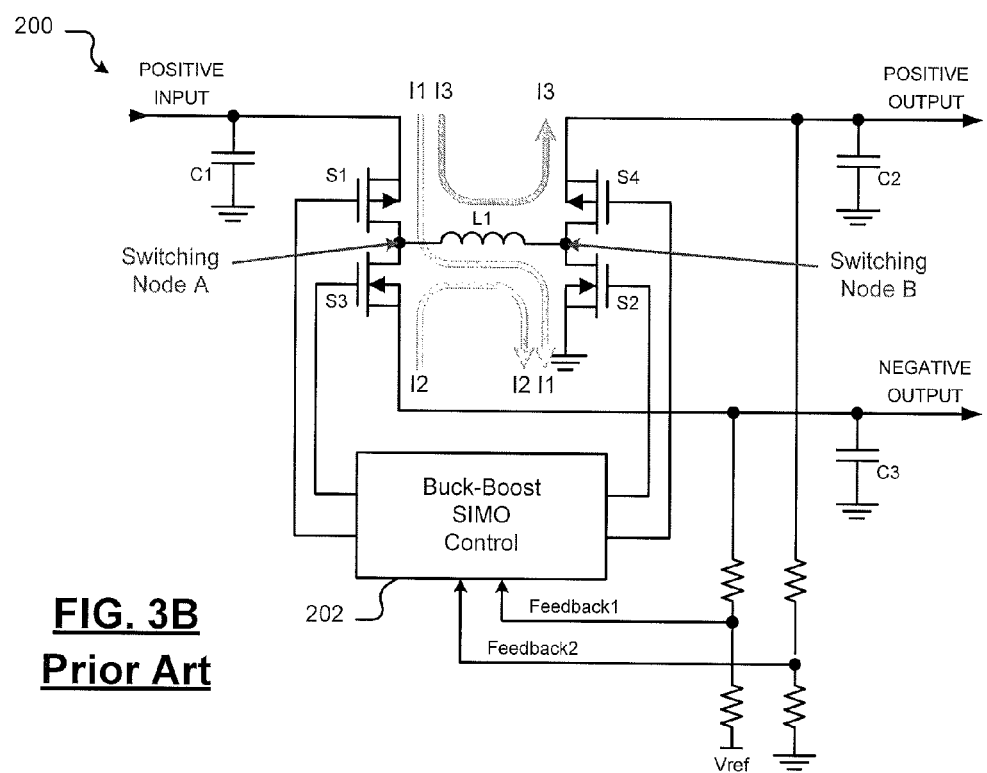
FIG. 3B depicts current paths through an inductor of the switching regulator of FIG. 3A.
Figure 3C:
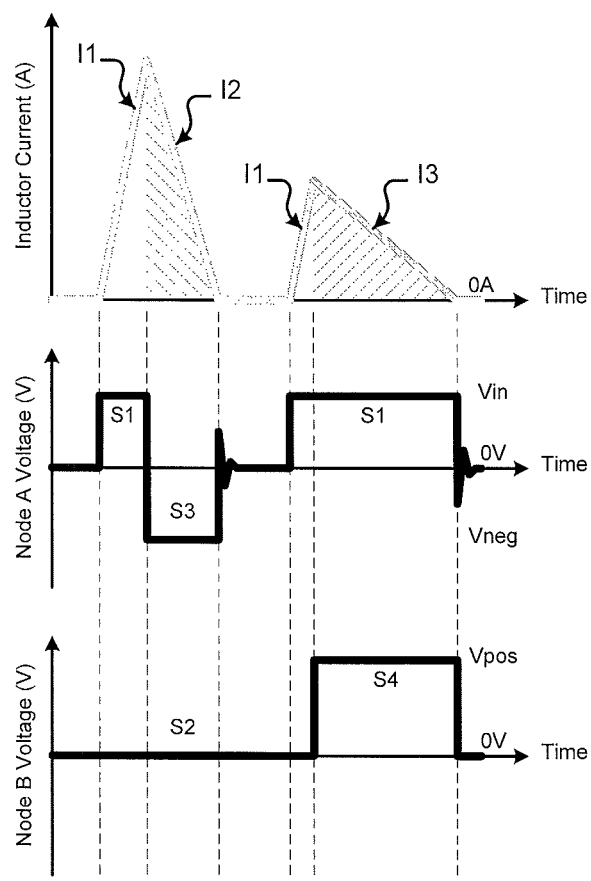
FIG. 3C depicts current and voltage waveforms for the inductor of the switching regulator of FIG. 3A.

FIGS. 3B and 3C respectively show current paths and waveforms of the switching regulator 200. The Buck-Boost SIMO control circuit 202 controls the switching regulator 200 as follows. On a first switching pulse, the current through the inductor L1 is first ramped up by turning on S1 and S2 (see current path 11). Then the current is ramped down by turning on S3 and S2, thus sinking current away from the negative output (see current path 12), until the inductor current returns to zero.

On a second (i.e., next) switching pulse, the current is ramped up again with S1 and S2 (see current path 11); albeit, not necessarily to the same peak current as before. Then the current is ramped down a second time by turning on S1 and S4, thus sourcing current to the positive output (see current path 13), until the inductor current returns again to zero.

Charge is delivered to the positive output and drawn from the negative output on every other switching pulse as shown by the shaded areas in FIG. 3C. The switching regulator 200 operates in discontinuous conduction mode (DCM), and the average inductor current is far below the peak inductor current. With pulse-width modulation (PWM) current-mode control, the above pattern is repeated continuously with the inductor current peaks individually modulated as necessary to service the load and maintain output voltage regulation. Similarly, with pulse-frequency modulation (PFM) control, the above individual switching pulses are repeated with frequency modulation as necessary to service the load and maintain output voltage regulation.

According to the present disclosure, as explained below in greater detail, the current waveform is controlled more optimally than described above. The inductor current operates in continuous conduction mode (CCM) so that the average inductor current is nearly as high as the peak inductor current. For a given inductor saturation current rating, this allows the inductor to store more energy in its magnetic flux. Conversely, for a given amount of energy storage requirement to meet the load, an inductor with a lower saturation current rating and smaller size may be chosen. Furthermore, the same can be said for the current ratings of the switches and their physical size. Also, charge is delivered to the positive output and drawn from the negative output simultaneously on every switching pulse (rather than on every other). Therefore, the input and output ripples are smaller (or conversely smaller capacitors suffice). This is accomplished via the following novel control scheme.

Figure 4A:
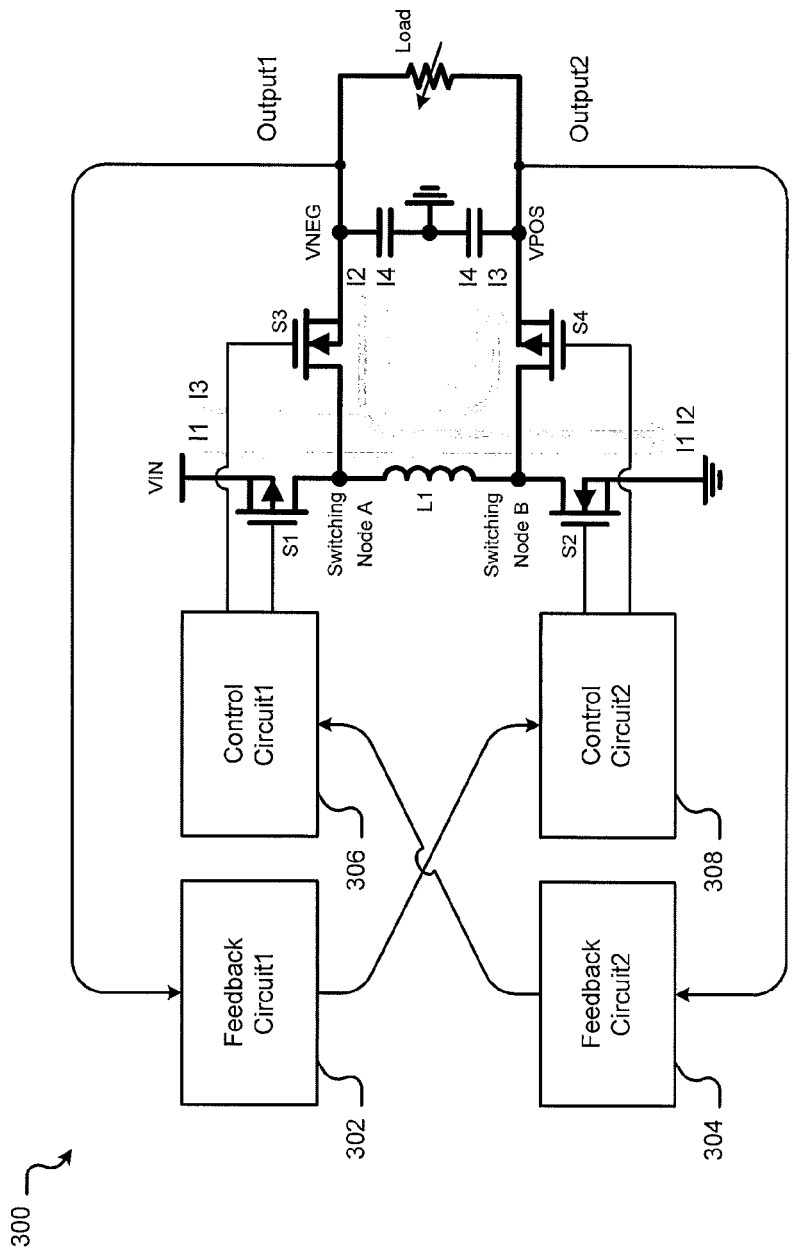
FIG. 4A is a simplified schematic of a switching regulator that uses a SIMO architecture and a novel feedback scheme to generate a non-inverting Buck-Boost output and an inverting Buck-Boost output.

FIG. 4A shows a switching regulator 300 according to the present disclosure. The switching regulator 300 comprises four switches (S1, S2, S3, and S4), an inductor (L1), first and second feedback circuits 302 and 304, and first and second control circuits 306 and 308. The switching regulator 300 generates a first output voltage (e.g., negative or VNEG) and a second output voltage (e.g., positive or VPOS). The first and second output voltages are generated using Buck-Boost control. A load may be connected across the first and second output voltages.

Figure 4B:
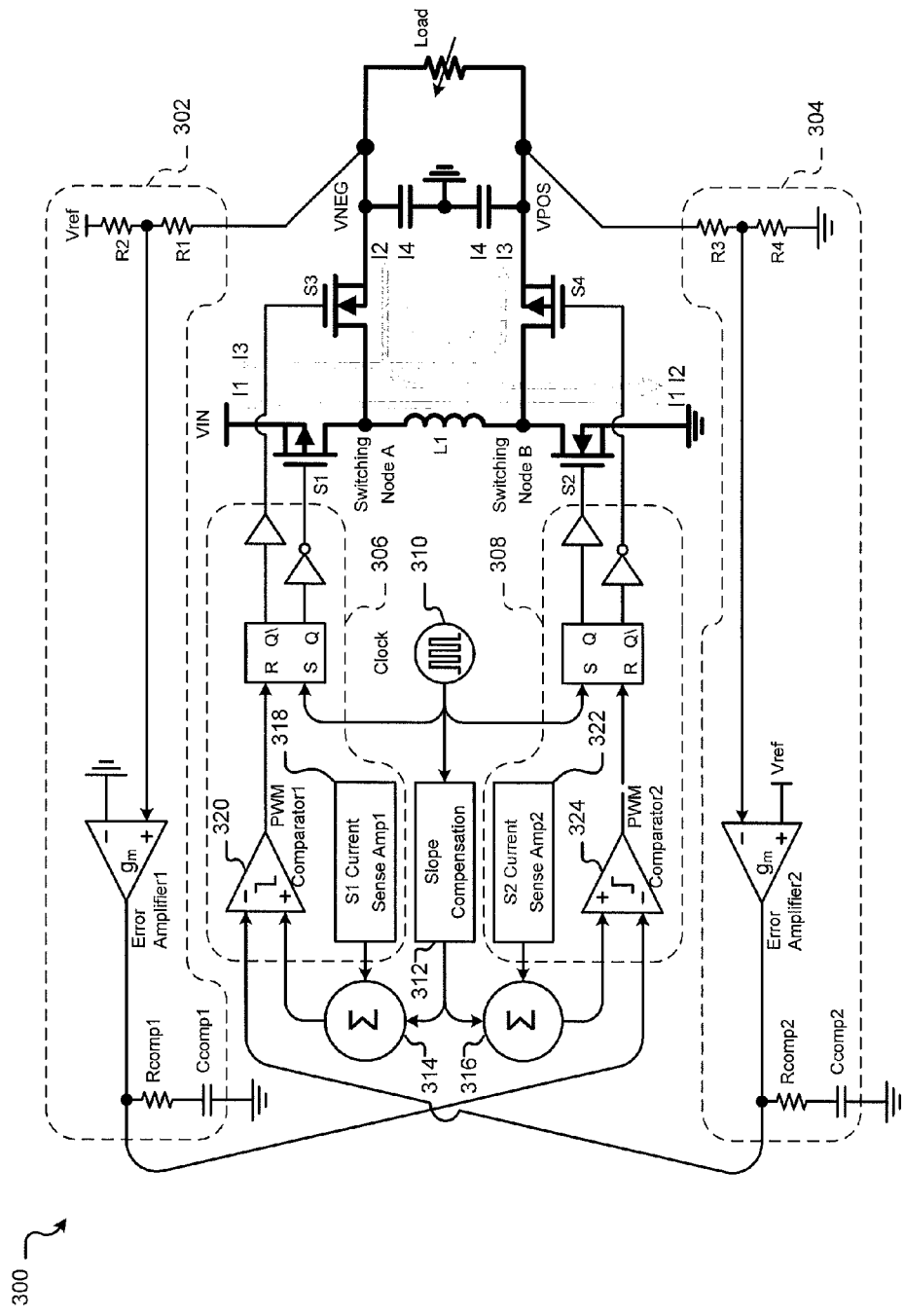
FIG. 4B is a detailed schematic of the switching regulator of FIG. 4A.

FIG. 4B shows a more detailed version of the same regulator 300, as shown in FIG. 4A. In FIG. 4B, each of the first and second feedback circuits 302 and 304 includes a voltage divider and a transconductance amplifier (shown as an error amplifier $g_m$). Each of the first and second feedback circuits 302 and 304 uses a single reference voltage $V_{ref}$ (instead of two reference voltages $+V_{ref}$ and $-V_{ref}$). In each feedback circuit, the connections to the reference voltage and the common potential may be reversed, depending upon the polarity of the reference voltage and the polarity of the output voltage. Additionally, two different reference voltages of the same polarity or of opposite polarity could instead be used with the proper connections. The example shown in FIG. 4B is generally favored for its use of a single, positive reference voltage.

The first feedback circuit 302 generates a first feedback signal based on a first feedback voltage received from a first voltage divider including resistors R1 and R2 connected to a first (e.g., negative) output of the switching regulator 300. The second feedback circuit 304 generates a second feedback signal based on a second feedback voltage received from a second voltage divider including resistors R3 and R4 connected to a second (e.g., positive) output of the switching regulator 300.

The first control circuit 306 controls switches S1 and S3, which generate the first (e.g., negative) output voltage of the switching regulator 300, based on the second feedback signal, which is generated by the second feedback circuit 304 based on the second (i.e., positive) output voltage of the switching regulator 300. The second control circuit 308 controls the switches S2 and S4, which generate the second (e.g., positive) output voltage of the switching regulator 300, based on the first feedback signal, which is generated by the first feedback circuit 302 based on the first (i.e., negative) output voltage of the switching regulator 300. The switches S1 and S2 may be referred to as first and second switches, and the switches S3 and S4 may be referred to as third and fourth switches. The switches may be realized as transistors of the MOSFET or bipolar or other type. Also, the switches S3 and S4 may be referred to as synchronous rectifiers. In general, switches S1 and S2 are used in the first phase of the duty-cycle to increase inductor current, while switches (or rectifiers) S3 and S4 are used in the later phase of the duty-cycle to transfer charge to or from the regulator outputs while discharging the inductor current.

The clock generator 310 generates clock signals that are output to the first and second control circuits 306 and 308 and the slope compensator 312. The slope compensator 312 generates one or more compensation signals to stabilize the operation of the switching regulator 300. The slope compensator 312 stabilizes the operation of the switching regulator 300 at a duty cycle greater than or equal to 50%. Additionally, the slope compensator 312 stabilizes the first and second output voltages of the switching regulator 300 in response to input line transients.

The first control circuit 306 includes a first current sensing circuit 318 and a first comparator 320. The first current sensing circuit 318 senses a first current through the first switch S1. The first summing circuit 314 sums the first current and the output of the slope compensator 312 and generates a first output. The first comparator 320 compares the first output to the second feedback signal and generates a first control signal to control the first and third switches S1 and S3 that generate the first (e.g., negative) output voltage of the switching regulator 300. Thus, the first control circuit 306 controls the first and third switches S1 and S3, which generate the first (e.g., negative) output voltage of the switching regulator 300, based on the second feedback signal, which is generated by the second feedback circuit 304 based on the second (i.e., positive) output voltage of the switching regulator 300.

The second control circuit 308 includes a second current sensing circuit 322 and a second comparator 324. The second current sensing circuit 322 senses a second current through the second switch S2. The second summing circuit 316 sums the second current and the output of the slope compensator 312 and generates a second output. The second comparator 324 compares the second output to the first feedback signal and generates a second control signal to control the second and fourth switches S2 and S4 that generate the second (e.g., positive) output voltage of the switching regulator 300. Thus, the second control circuit 308 controls the second and fourth switches S2 and S4, which generate the second (e.g., positive) output voltage of the switching regulator 300, based on the first feedback signal, which is generated by the first feedback circuit 302 based on the first (i.e., negative) output voltage of the switching regulator 300.

Figure 4C:
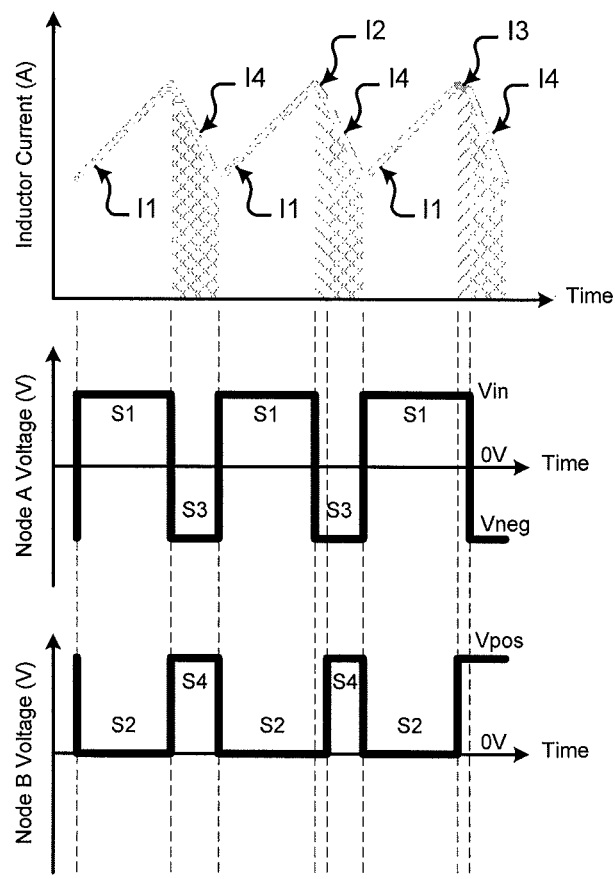
FIG. 4C depicts current and voltage waveforms for the inductor of the switching regulator of FIG. 4A.

FIG. 4C shows the waveforms of the switching regulator 300. The first and second control circuits 306 and 308 operate the switches S1 and S2 in pulse-width modulated current-mode continuous conduction mode at a duty cycle. In the first phase of switching, switches S1 and S2 are closed in conjunction with the PWM clock generator so as to ramp up inductor current through current path 11 (shown in FIGS. 4A-4C). The first and second control circuits 306 and 308 turn off the switches S1 and S2 and turn on the switches S3 and S4 to provide a current path (14 shown in FIG. 4C) through the inductor L1 during a second half of the duty cycle. Further, the first and second control circuits 306 and 308 operate the switches S1 and S2 in peak-current mode. As shown in FIG. 4C, the first and second control circuits 306 and 308 independently modulate beginning of turn-off time of the switches S1 and S2 to regulate current through the load that is connected at the outputs across the switches S3 and S4. The switches S1 and S2 may turn-off simultaneously, S1 first then S2, or S2 first then S1, per the independent modulation control. This modulation scheme enables the combined control of the first (e.g., negative) output voltage and the second (e.g., positive) output voltage in response the changing output load current and changing input voltage.

In some applications, a load such as an active-matrix organic light-emitting diode (AMOLED) display is connected from the positive output to the negative output. In such applications, the positive and negative load currents are symmetrical (the same except for polarity). However, the positive and negative output voltages are often not symmetrical and have to be individually regulated. In FIGS. 4A and 4B, the symmetrical load current will allow the current path 14 (S3 and S4 turned on) to dominate the time when the inductor L1 is being discharged. The current paths 12 and 13 are only enabled for relatively short periods to allow the output voltages to be independently modulated into regulation.

Furthermore, in FIGS. 4A and 4B, the load current is shown to be symmetrical between the two outputs; however, each output may have unsymmetrical load current as well as unsymmetrical output voltage. In such cases, the first and second control circuits 306 and 308 will independently modulate the beginning of turn-off time of the switches S1 and S2 to regulate each output by turning off either S1 first then S2, or S2 first then S1, to a larger proportion in response to how unsymmetrical the output loads and voltages are.

The switching regulator 300 provides many benefits. First, a single inductor and only four switches are used to generate two outputs. Both outputs (VNEG and VPOS) of the switching regulator 300 become buck-boost; therefore, the input voltage of the switching regulator 300 can be greater than or less than the magnitudes of both the positive and negative output voltages of the switching regulator 300. When the switching regulator 300 is turned off (i.e., disabled), both the outputs (VNEG and VPOS) of the switching regulator 300 can return to zero volts without any additional true-shutdown circuits, which are needed in a Boost-only solution. Typical soft-start techniques (such as ramping Vref) work well with the switching regulator 300. Additionally, the inductor current operates in continuous conduction mode (CCM), allowing average inductor current to approach peak inductor current at heavy loads, so as to fully utilize the energy storage capability of an inductor with a given saturation current rating. Additionally, using transistors as switches, the switching regulator 300 can regulate the outputs at no load.

Figure 5:
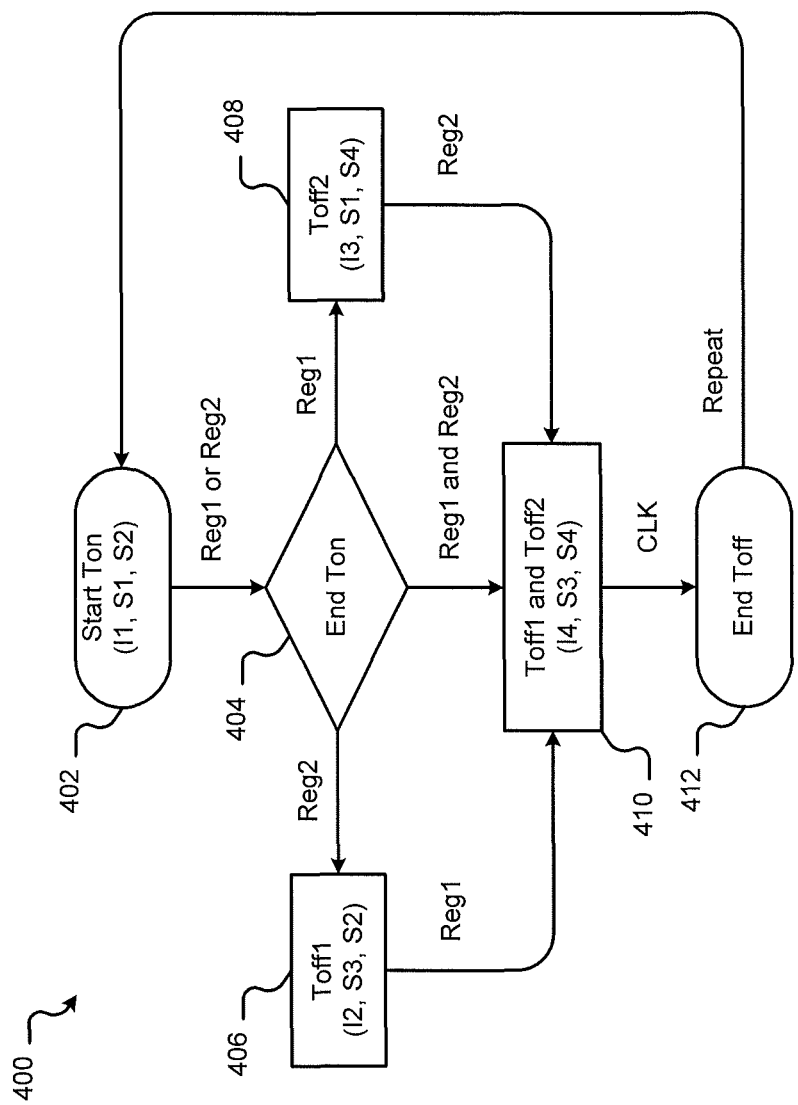
FIG. 5 is a flowchart of a method for controlling a switching regulator (e.g., the switching regulator of FIG.

FIG. 5 shows a method 400 for controlling a switching regulator (e.g., the switching regulator 300 of FIGS. 4A and 4B). At 402, a new switching cycle is initiated after completion of a prior switching cycle. The new switching cycle begins with the start of an on-time. During the on-time, the first and second switches (S1 and S2 from FIGS. 4A and 4B) are closed, so that inductor current (11 from FIGS. 4A-4C) ramps up due to the voltage across the inductor.

During the on-time, a first feedback circuit (302 from FIGS. 4A and 4B) monitors a first output (e.g., VNEG from FIGS. 4A and 4B) to generate a first feedback signal. At the same time, a second feedback circuit (304 from FIGS. 4A and 4B) monitors a second output (e.g., VPOS from FIGS. 4A and 4B) to generate a second feedback signal. The second feedback signal is sent to a first control circuit (306 in FIGS. 4A and 4B), while the first feedback signal is sent to a second control circuit (308 in FIGS. 4A and 4B). The first and second control circuits contain first and second PWM comparators (320 and 324 in FIG. 4B), respectively. In the method 400 of FIG. 5, a first condition Reg1 is defined as when the first feedback signal is sufficient to trip the second PWM comparator, and a second condition Reg2 is defined as when the second feedback signal is sufficient to trip the first PWM comparator.

At 404, the on-time is ended as soon as either condition Reg1 or condition Reg2 first exists. If condition Reg2 exists, but condition Reg1 does not, then a first off-time is initiated at 406. If condition Reg1 exists, but condition Reg2 does not, then a second off-time is initiated at 408. If both conditions Reg1 and Reg2 exist, then both the first and second off-times are initiated simultaneously at 410.

During the first off-time at 406, the first switch (S1 from FIGS. 4A and 4B) is opened and a third switch (S3 from FIGS. 4A and 4B) is closed. The second switch (S2 from FIGS. 4A and 4B) remains closed. During this first off-time, inductor current flows from the first output through the third switch, the inductor, and the second switch to a common potential (12 in FIGS. 4A-4C). Because charge is now being removed from the first (e.g., negative) output, at some short time later, condition Reg1 is also met, and method 400 initiates the second off-time in addition to the first off-time at 410.

During the second off-time at 408, the second switch (S2 from FIGS. 4A and 4B) is opened and a fourth switch (S4 from FIGS. 4A and 4B) is closed. The first switch (S1 from FIGS. 4A and 4B) remains closed. During this second off-time, inductor current flows from the input source through the first switch, the inductor, and the fourth switch to the second output (13 in FIGS. 4A-4C). Because charge is now being added to the second (e.g., positive) output, at some short time later, condition Reg2 is also met, and method 400 initiates the first off-time in addition to the second off-time at 410.

At 410, when both the first and second off-times are concurrent, the first and second switches (S1 and S2 from FIGS. 4A and 4B) are opened, and the third and fourth switches (S3 and S4 from FIGS. 4A and 4B) are closed. During this combined off-time, inductor current flows from the first output through the third switch, the inductor, and the fourth switch to the second output (14 in FIGS. 4A-4C). Charge is now simultaneously being removed from the first (e.g., negative) output and added to the second (e.g., positive) output, and inductor current ramps down due to the voltage across the inductor.

The combined off-time at 410 is ended at 412 when the clock (310 from FIG. 4B) terminates the switching cycle. At the end of the off-time, a new on-time is initiated at 402 and the switching cycle is repeated.

In the method 400, switching cycles are repeated so long as the circuit is enabled and the clock is running. Generally, a fixed-frequency clock is applied and pulse-width-modulation (PWM) peak-current-mode control circuitry is used, as shown in FIG. 4B. However, those skilled in the art of switching regulator control theory will recognize that method 400 of FIG. 5 and the crossed-over control scheme of FIG. 4A can be implemented with other control architectures, such as, but not limited to, PWM valley-current-mode, PWM voltage-mode, hysteretic voltage- or current-mode, constant or adaptive on-time or off-time, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:
1. A system comprising:
an inductor having first and second terminals;
a first transistor having a first terminal connected to the first terminal of the inductor, and a second terminal connected to a power supply;
a second transistor having a first terminal connected to the second terminal of the inductor, and a second terminal connected to a common potential;
a third transistor having a first terminal connected to the first terminal of the inductor, and a second terminal providing a first output voltage having a first polarity;
a fourth transistor having a first terminal connected to the second terminal of the inductor, and a second terminal providing a second output voltage having a second polarity;
a first feedback circuit that generates a first feedback signal based on the first output voltage;
a second feedback circuit that generates a second feedback signal based on the second output voltage;
a first control circuit that controls the first and third transistors based on the second feedback signal and not based on the first feedback signal; and
a second control circuit that controls the second and fourth transistors based on the first feedback signal and not based on the second feedback signal.
2. The system of claim 1 wherein both the first and second output voltages are of Buck-Boost type, the first output voltage being an inverting buck-boost type, and the second output voltage being a non-inverting buck-boost type.

3. The system of claim 1 wherein the first and second control circuits operate the first and second transistors in pulse-width modulated current-mode continuous conduction mode at a duty cycle, and wherein the first and second control circuits turn on the third and fourth transistors and provide a current path through the inductor during a second half of the duty cycle.

4. The system of claim 1 wherein the first and second control circuits respectively operate the first and second transistors in peak-current mode and modulate beginning of turn-off time of the first and second transistors to regulate current through a load connected across the second terminals of the third and fourth transistors.

5. The system of claim 1 wherein:
the first feedback circuit comprises a first voltage divider connected across the first output voltage and a reference voltage, and a first error amplifier that has first and second inputs respectively coupled to an output of the first voltage divider and a common potential; and
the second feedback circuit comprises a second voltage divider connected across the second output voltage and the common potential, and a second error amplifier that has first and second inputs respectively coupled to an output of the second voltage divider and the reference voltage.

6. The system of claim 1 wherein:
the first control circuit comprises a first current sensing amplifier that senses current through the first transistor and a first comparator that generates a first control signal to control the first and third transistors based on the second feedback signal and an output of the first current sensing amplifier; and
the second control circuit comprises a second current sensing amplifier that senses current through the second transistor and a second comparator that generates a second control signal to control the second and fourth transistors based on the first feedback signal and an output of the second current sensing amplifier.

7. The system of claim 1 further comprising a slope compensator that outputs a compensating signal to the first and second control circuits that stabilizes operation of the first and second transistors at a duty cycle greater than or equal to 50% and that stabilizes the first and second output voltages in response to input voltage transients.

8. A system comprising:
a regulator comprising first and second transistors each having first and second terminals and a control terminal; the first terminal of the first transistor generating a first output having a first polarity; and the first terminal of the second transistor generating a second output having a second polarity;
a first feedback circuit that generates a first feedback signal based on the first output;
a second feedback circuit that generates a second feedback signal based on the second output;
a first control circuit that controls the control terminal of the first transistor based on the second feedback signal and not based on the first feedback signal; and
a second control circuit that controls the control terminal of the second transistor based on the first feedback signal and not based on the second feedback signal.

9. The system of claim 8 wherein:
the first feedback circuit comprises a first voltage divider connected across the first output and a reference voltage, and a first error amplifier that has first and second inputs respectively coupled to the output of the first voltage divider and a common potential; and
the second feedback circuit comprises a second voltage divider connected across the second output and the common potential, and a second error amplifier that has first and second inputs respectively coupled to the output of the second voltage divider and the reference voltage.

10. The system of claim 8 further comprising a slope compensator that outputs a compensating signal to the first and second control circuits that stabilizes operation of the first and second transistors at a duty cycle greater than or equal to 50% and that stabilizes the first and second outputs in response to input voltage transients.

11. The system of claim 8 wherein:
the regulator further comprises third and fourth transistors and an inductor;
first terminals of the first and second transistors are respectively connected to first and second terminals of the inductor;
first terminals of the third and fourth transistors are respectively connected to the first and second terminals of the inductor;
second terminals of the first and second transistors are respectively connected to a power supply and a common potential; and
second terminals of the third and fourth transistors respectively provide the first and second outputs.

12. The system of claim 11 wherein the first and second control circuits respectively operate the first and second transistors in pulse-width modulated current-mode continuous conduction mode at a duty cycle, and wherein the first and second control circuits respectively turn on the third and fourth transistors and provide a current path through the inductor during a second half of the duty cycle.

13. The system of claim 11 wherein the first and second control circuits respectively operate the first and second transistors in peak-current mode and respectively modulate beginning of turn-off time of the first and second transistors to regulate current through a load connected across the second terminals of the third and fourth transistors.

14. The system of claim 11 wherein:
the first control circuit comprises a first current sensing amplifier that senses current through the first transistor and a first comparator that generates a first control signal to control the first and third transistors based on the second feedback signal and an output of the first current sensing amplifier; and
the second control circuit comprises a second current sensing amplifier that senses current through the second transistor and a second comparator that generates a second control signal to control the second and fourth transistors based on the first feedback signal and an output of the second current sensing amplifier.

15. A method comprising:
generating first and second output voltages having first and second polarities using first and second transistors, each having first and second terminals and a control terminal; the first terminal of the first transistor generating the first output voltage having the first polarity; and the first terminal of the second transistor generating the second output voltage having the second polarity;
generating a first feedback signal based on the first output voltage;
generating a second feedback signal based on the second output voltage;
controlling the control terminal of the first transistor based on the second feedback signal and not based on the first feedback signal; and controlling the control terminal of the second transistor based on the first feedback signal and not based on the second feedback signal.

16. The method of claim 15 further comprising:
generating the first and second output voltages using a single inductor coupled to the first and second transistors,
wherein both the first and second output voltages are of Buck-Boost type, with one of the first and second output voltages being an inverting Buck-Boost type, and the other of the first and second output voltages being a non-inverting Buck-Boost type.

17. The method of claim 15 further comprising:
generating the first and second output voltages using a single inductor coupled to the first and second transistors;
operating the first and second transistors in pulse-width modulated current-mode continuous conduction mode at a duty cycle; and
providing a current path through the single inductor during a second half of the duty cycle.

18. The method of claim 15 further comprising:
operating the first and second transistors in peak-current mode, valley-current mode, or average-current mode; and
modulating beginning of turn-off time of the first and second transistors to regulate at least one of current through a load, voltage across a load, current into two independent loads, voltage across two independent loads, and current into one load and voltage across another load.

19. The method of claim 15 further comprising:
operating the first and second transistors in current mode or voltage mode; and
modulating beginning of turn-on time and/or turn-off time of the first and second transistors to regulate at least one of current through a load, voltage across a load, current into two independent loads, voltage across two independent loads, and current into one load and voltage across another load.

20. The method of claim 15 further comprising:
generating the first and second output voltages using a single inductor coupled to the first and second transistors;
sensing first and second currents respectively through the first and second transistors or a current-sense element in series with the first and second transistors or a current-sense network in parallel with the first and second transistors or a current-sense network in parallel with the single inductor;
generating a first control signal to control the first transistor based on the second feedback signal and the first current; and
generating a second control signal to control the second transistor based on the first feedback signal and the second current.

21. A method comprising:
generating a first output voltage having a first polarity using a first transistor;
generating a second output voltage having a second polarity using a second transistor;
generating a first feedback signal based on the first output voltage;
generating a second feedback signal based on the second output voltage;
controlling the first transistor based on the second feedback signal and not based on the first feedback signal;
controlling the second transistor based on the first feedback signal and not based on the second feedback signal;
generating the first and second output voltages using a single inductor coupled to the first and second transistors;
sensing a first current through the first transistor or a current-sense element in series with the first transistor or a current-sense network in parallel with the first transistor or a current-sense network in parallel with the single inductor;
sensing a second current through the second transistor or a current-sense element in series with the second transistor or a current-sense network in parallel with the second transistor or the current-sense network in parallel with the single inductor;
generating a first control signal to control the first transistor based on the second feedback signal and the first current; and
generating a second control signal to control the second transistor based on the first feedback signal and the second current.

* * * * *

UNITED STATES PATENT AND TRADEMARK OFFICE
CERTIFICATE OF CORRECTION

PATENT NO. : 9,837,901 B1  
APPLICATION NO. : 14/745788  
DATED : December 5, 2017  
INVENTOR(S) : Karl Volk Page 1 of 1

It is certified that error appears in the above-identified patent and that said Letters Patent is hereby corrected as shown below:

| | |
|---|---|
| Column 5, Line 64 | Delete "11")." and insert -- I1). -- |
| Column 5, Line 66 | Delete "12")," and insert -- I2), -- |
| Column 6, Line 2 | Delete "11");" and insert -- I1); -- |
| Column 6, Line 6 | Delete "13")," and insert -- I3), -- |
| Column 8, Line 10 | Delete "11" and insert -- I1 -- |
| Column 8, Line 13 | Delete "(14" and insert -- (I4 -- |
| Column 8, Line 37 | Delete "14" and insert -- I4 -- |
| Column 8, Line 38 | Delete "12" and insert -- I2 -- |
| Column 8, Line 38 | Delete "13" and insert -- I3 -- |
| Column 9, Line 10 | Delete "(11" and insert -- (I1 -- |
| Column 9, Line 41 | Delete "(12" and insert -- (I2 -- |
| Column 9, Line 52 | Delete "(13" and insert -- (I3 -- |
| Column 9, Line 63 | Delete "(14" and insert -- (I4 -- |

Signed and Sealed this  
Twenty-ninth Day of May, 2018

Andrei Iancu  
*Director of the United States Patent and Trademark Office*